Figures 1, 2:
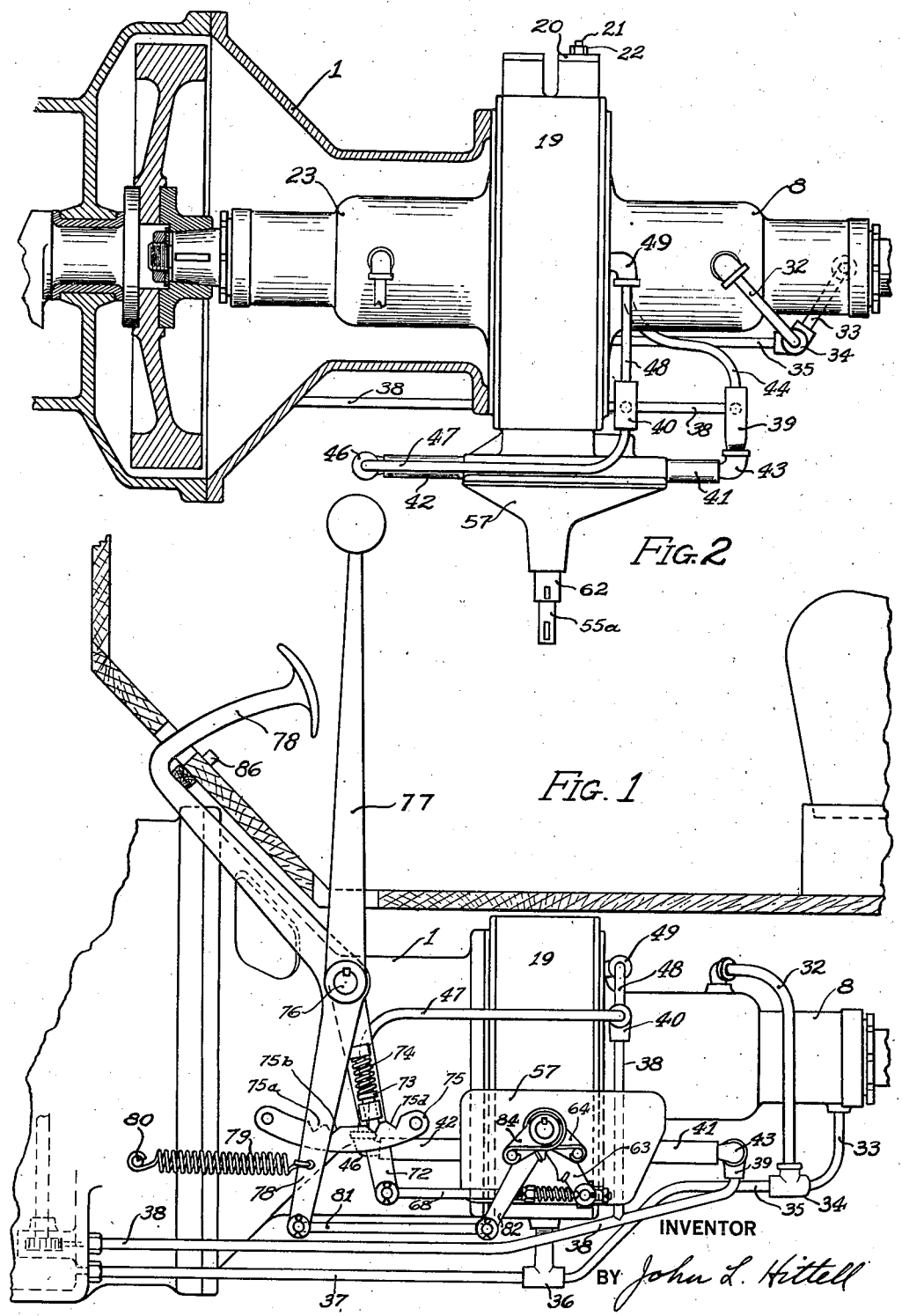

Dec. 1, 1936. J. L. HITTELL 2,062,310
VARIABLE SPEED TRANSMISSION
Filed July 29, 1932 5 Sheets-Sheet 1

INVENTOR
BY *John L. Hittell*
ATTORNEY

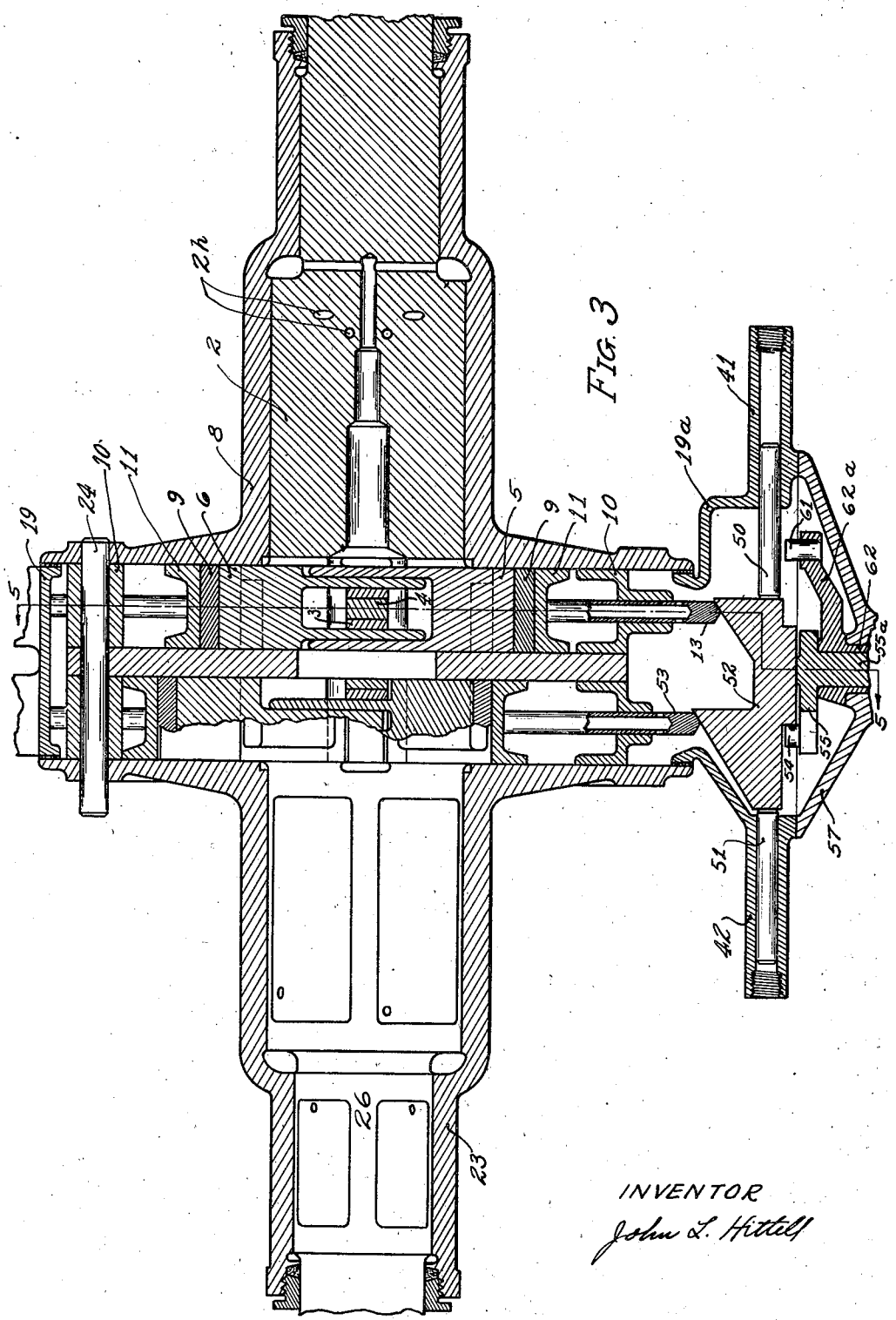

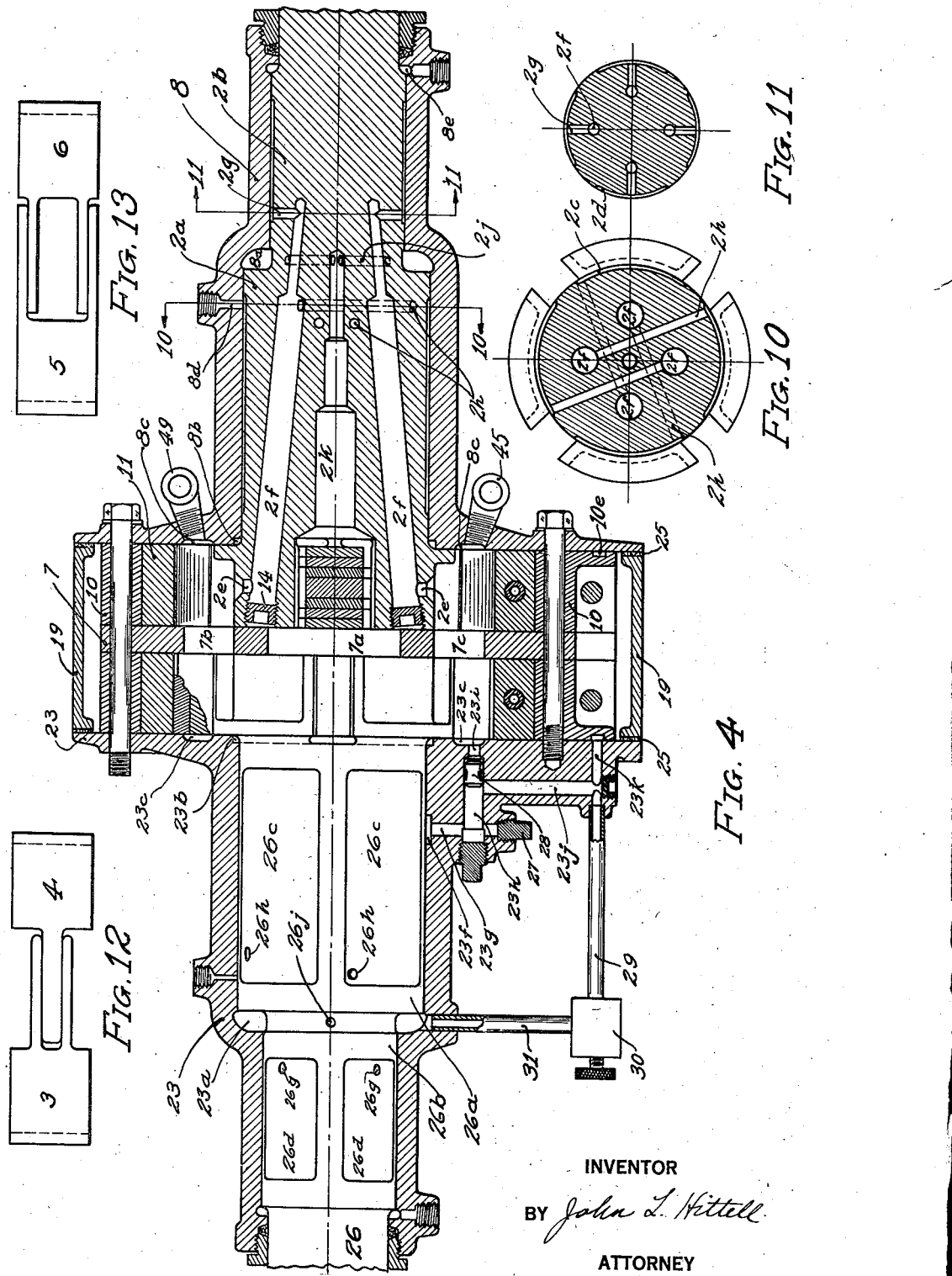

INVENTOR
John L. Hittell

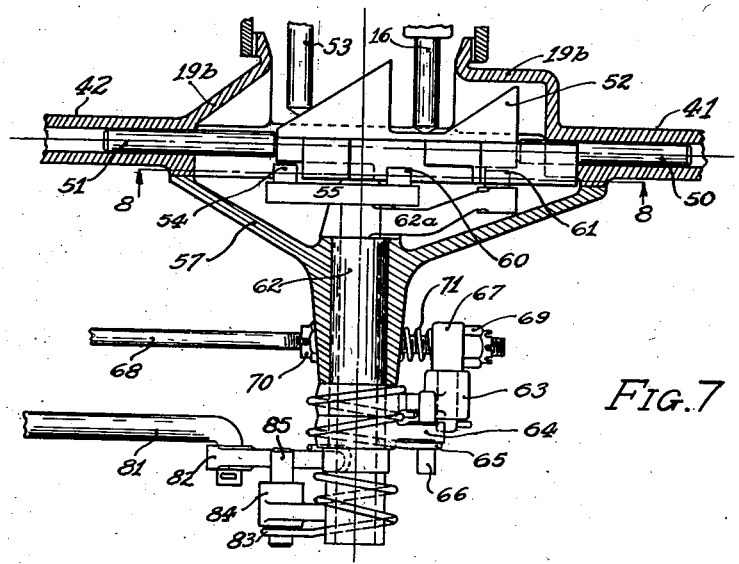
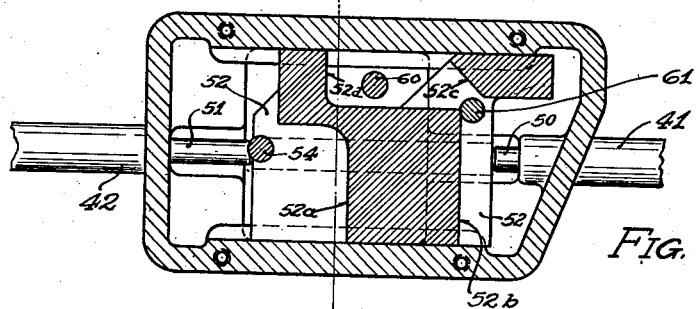
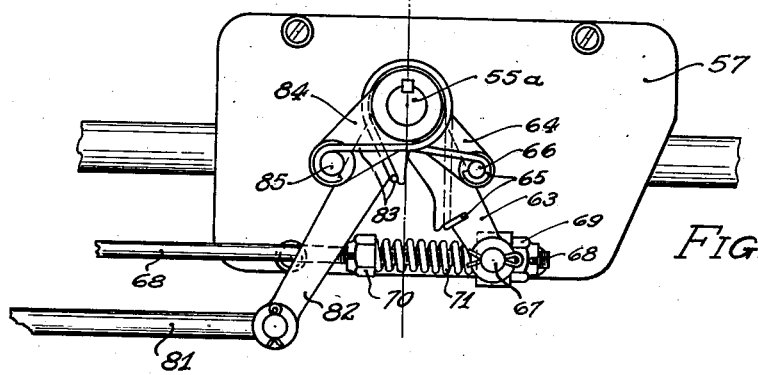

Patented Dec. 1, 1936

2,062,310

UNITED STATES PATENT OFFICE 2,062,310

VARIABLE SPEED TRANSMISSION

John Lindsay Hittell, Chicago, Ill., assignor to The Automatic Transmission Engineering Company, a trust; John Lindsay Hittell, trustee Application July 29, 1932, Serial No. 626,159

48 Claims. (Cl. 60—53)

This invention relates to variable speed transmissions of the hydraulic type, wherein the power applied to the input shaft operates a fluid pump, the fluid thus delivered operating a fluid motor which drives the output shaft. The general object of my invention is to reduce the cost and improve the efficiency and durability of such devices.

One specific object of my invention is to provide in a device of this character, novel construction of the pump and motor whereby much larger displacement of these units is attained without increase in the general size of the apparatus, thus securing large power transmitting capacity with small size, low weight, moderate operating fluid pressures and low cost of manufacture.

A further object of my invention is to insure increased efficiency by providing main fluid passages between pump and motor which are very short and of large cross section, and arranged for entrance and exit of fluid with a minimum of turbulence, thereby insuring very low fluid friction, with accompanying low heating and high efficiency.

An important object of this invention is to provide improved means for varying the ratio of the transmission by providing improved mechanism for translating the operation of the controlling elements into variation in the displacement of the pump or motor.

Another object is to provide an improved automatic ratio control mechanism whereby the input torque of the transmission is maintained at a substantially constant value throughout a wide range of ratios, thus affording a very constant load on the prime mover and thereby tending to prevent either racing or stalling of same, while at the same time providing within limits, any desired torque at the output shaft by simply varying the prime mover speed. These characteristics make it an almost ideal transmission for gasoline powered automobiles.

A further object of my invention is to provide means whereby the range of ratios provided by the transmission and available under the automatic ratio control extends to step up ratios, thus when vehicle speeds are high but it is not desired to further increase speed, the necessary output torque to maintain speed may be secured at low prime mover speed and well opened throttle rather than at high prime mover speed and proportionately closed throttle as in present day automobiles. The several advantages thus secured are lower prime mover speed with reduced wear and tear and more pleasurable driving, reduced oil consumption through reduced prime mover speed and through reduction of the vacuum in the prime mover cylinders during intake stroke, and saving in fuel through reduction in power absorbed in drawing the mixture through the throttle valve. The range of step up ratios thus provided is not limited by the nature of the device, which by reason of certain of my improvements may be so proportioned that the step up ratio may be safely permitted to become infinite, whereby the effect commonly known as free wheeling may be attained by means of a gradual and automatic change in the transmission ratio, rather than by means of a roller ratchet or other device operating in a similar way.

A further object of my invention is to provide in conjunction with the above described automatic ratio control characteristics, a convenient manually operable means for overcoming the action of the automatic device and so changing the transmission ratio as to powerfully retard the vehicle without the use of the usual brakes; and further, to provide in conjunction with the said manual control, means whereby (regardless of the manual effort applied) the retarding effect produced is definitely limited, thus minimizing skidding and avoiding excess mechanical and hydraulic stresses.

Various unique features of this invention contribute to the attainment of the objects aforementioned, and other objects as appear herein.

As the operation of this transmission varies under different settings of the manually controlled elements of the control mechanism, there are several different ways of functioning each of which involves certain inter-relation of the action of the various elements of the transmission. Therefore to facilitate a full understanding of the device and its operation, the structure is first described in detail and subsequently each way of functioning is separately described.

Figures 5, 6:
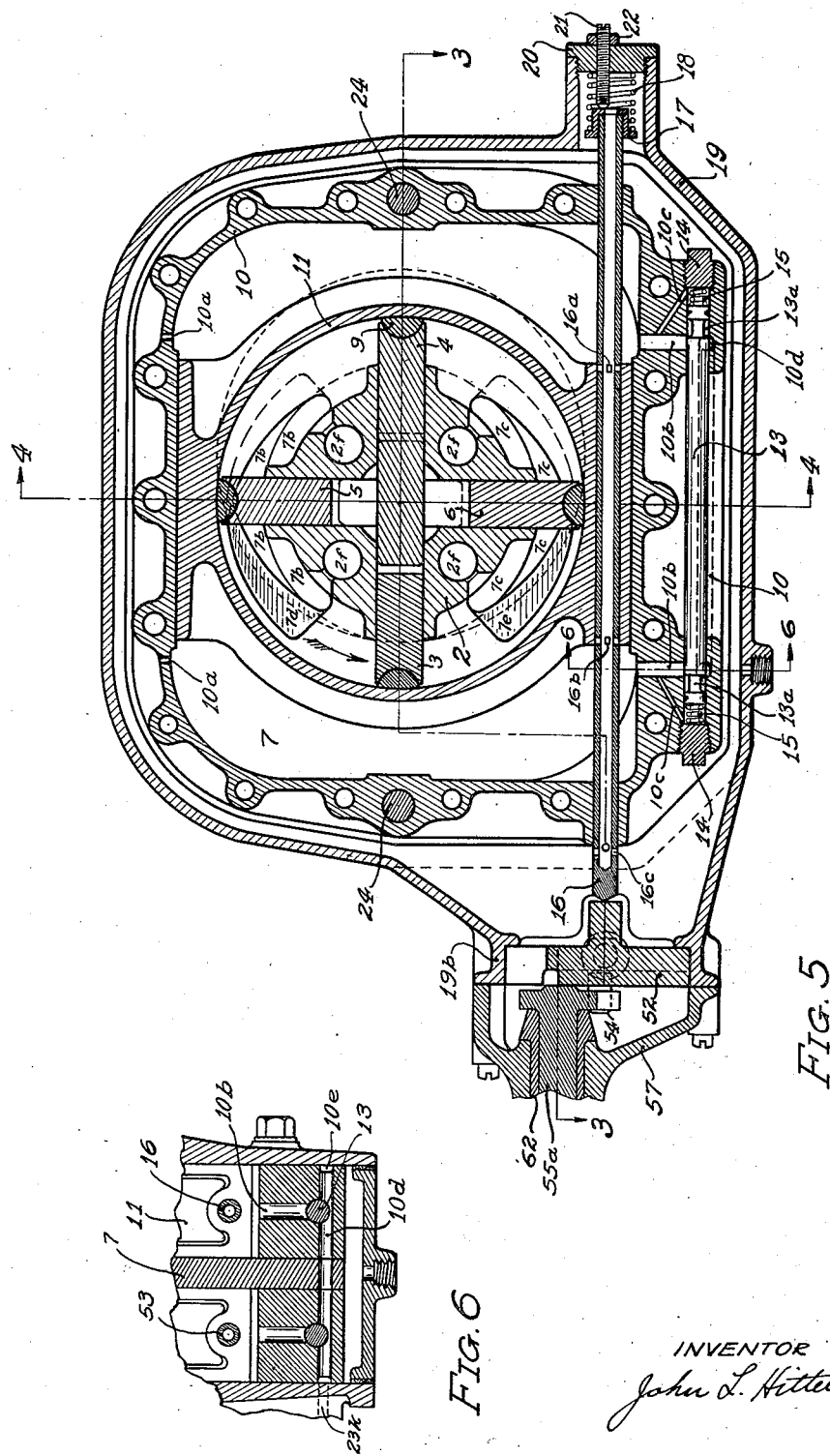

An individual embodiment of my invention, which is defined in its full aspects in the appended claims, is shown in the accompanying drawings. Fig. 1 is a side view of a complete transmission as installed in an automobile. Fig. 2 is a plan view of this transmission with the external control levers and other external elements of the control mechanism removed and with a mounting housing 1 and a portion of the prime mover shown in section. Fig. 3 is a stepped section substantially along the line 3—3 of Fig. 5, with the pump rotor in partial full view. Fig. 4 shows a vertical section along the line 4—4 of Fig. 5, with the pump rotor and some smaller parts shown in full view, and with the motor rotor turned 45° from the positions shown in Figs. 3 and 5. Fig. 5 is a stepped transverse section along the line 5—5 of Fig. 3, with the motor rotor turned 90° from the position shown in Fig. 3. Fig. 6 is a partial vertical section along the line 6—6 of Fig. 5. Fig. 7 shows elements of the control mechanism in full view, with the housing thereof shown in section, and with some elements of the control mechanism in different positions than in Fig. 3. Fig. 8 is a section along the line 8—8 of Fig. 7. Fig. 9 shows the externally visible elements of Fig. 7 looking at the shaft end. Fig. 10 is a view of the motor rotor in transverse section along the line 10—10 of Fig. 4; and Fig. 11 shows a transverse section of the motor rotor along the line 11—11 of Fig. 4. Fig. 12 is a view of a pair of vanes; and Fig. 13 is a view of the other pair of vanes of the motor rotor.

In Figs. 2, 3 and 4, the left hand portions of the views show the front part of the transmission including the fluid pump, herein referred to as the pump, and the right hand portions show the rear part of the transmission including the fluid motor, herein referred to as the motor. To avoid confusion the power source which drives the pump shaft is herein referred to as the prime mover.

The pump and motor used in this transmission are of the vane type. The principles and general arrangement of such pumps and motors are well known to those skilled in the art.

This transmission includes a pump and a motor disposed at opposite sides of and abutting a central member called a port plate 1, which forms a portion of the housing of both the pump and the motor. The pump and motor are identical in most respects, the main structural differences being in details of the housings and in the shapes of the shaft ends. Therefore, in connection with the differences herein described, the entire construction of the pump will be made clear by the following detailed description of the motor structure.

The motor comprises a housing 8 in which is journalled a rotor 2. The portion of the rotor extending beyond the face of the housing is herein termed the rotor head, and contains two cross slots in which are slidably fitted the vanes 3 and 4 in one slot and the vanes 5 and 6 in the other slot. The vanes are so cut away at the portion which forms the central section of an assembled pair that the other pair may cross without interference. These cut away portions are of such size that one pair of vanes may slide lengthwise a certain distance from the central position before the end of the cut away portion strikes the side of the other pair of vanes. This distance is represented by the blank space in Figure 5 between vane 5 and vane 4. Each vane is so proportioned that this amount of movement inward from the position shown in Figure 5 is available without interference with the pair of vanes transverse thereof.

Each vane is fitted with a rocker 9 in arcuate contact with the outer end of the vane, and the rockers 9 are so formed that they may also be in arcuate contact with the cylindrical bore of a guide ring 11, which is slidably fitted in a pressure housing 10 and held between the port plate 7 and the motor housing 8 in a slidable fit.

The arrangement and proportioning of the rotor and vanes permit the rotor assembly to be rotated while the guide ring 11 is moved a certain distance to either side from the position shown in Figure 5. The amount of movement off center which is provided for the guide ring may be equal to the amount of inward movement of each vane available as hereinbefore described, and the largest diameter of the rotor 2 so proportioned as to clear the bore of the guide ring when same is at maximum off center position.

The end face of the rotor head is in working contact with the central portion of the port plate 7, and the shoulder face of the rotor head is in similar contact with a central ring shaped portion of the face of motor housing 8. The depth of the two cross slots in the rotor head is greater than the length of the head, therefore these slots divide the head into four segments which are integral with and supported by the journal portion of the rotor. This construction divides the shoulder face of the rotor head into four segments as shown in Figure 10. The vanes 3, 4, 5, and 6 are so proportioned that the edge faces thereof are flush with the end face and shoulder face of the rotor head when assembled therein, and therefore also in working contact with the port plate and the end face of the motor housing 8.

The space around the head of rotor 2 between the head and the bore of the guide ring 11 is bounded also by the faces of the motor housing 8 and the port plate 7, and may be termed the active fluid chamber of the motor. The vanes divide this chamber into four smaller chambers. When the bore of the guide ring is eccentric to the rotor, each of these four smaller chambers varies in volumetric capacity as the rotor turns; they are therefore hereinafter referred to as variable capacity chambers.

The rotor 2 has two journal portions 2a and 2b fitted in two coaxial bores in the motor housing 8. The journal portion 2a has four shallow recesses 2c equally spaced around the diameter as shown in Figure 10, and the journal portion 2b has four similarly arranged recesses 2d as shown in Figure 11. Each recess is sealed from the other parts of the mechanism by a surrounding marginal portion of the journal bearing surface. The recesses 2c and 2d are in angular alignment with the variable capacity chambers, and the rotor may be considered as comprising four quarters, each of which contains one recess 2c, one recess 2d, and (in connection with the vanes) the rotating boundaries of one variable capacity chamber. Each variable capacity chamber is in communication with the 2d recess which is in the same quarter, and with the 2c recess which is in the diametrally opposed quarter. This is accomplished by means of ports 2e, longitudinal passages 2f, ports 2g, and transverse passages 2h. Each passage 2h crosses the rotor and places one of the longitudinal passages 2f in communication with the recess 2c which is in the diametrically opposite quarter as shown in Figure 10. Two of the transverse passages 2h are in the plane of Figure 10, and pass across the rotor as shown without intersecting, and the other two are in a slightly different plane, so that none of the passages 2h communicates with each other.

An annular recess 8a is formed in the motor housing 8 at the step between the two bores. The rotor 2 has cross ducts 2j communicating with this annular recess and with a central bore 2k. Another annular recess 8b is formed in the motor housing 8 at the junction of the face and the larger bore. Since the cross slots in the rotor head are deeper than the length of the head, and the width of the full width portion of the vanes is the same as the length of the rotor head, passages are formed between the edges of the vanes and the bottoms of the cross slots. These passages place the annular recess 8b in communication with the central bore 2k in the rotor 2.

The cross slots in the rotor head are wider at the extreme bottom than at the portion in which the vanes fit, to facilitate grinding the sides of the slots to an accurate fit for the vanes.

Portions of the rotor head are of reduced diameter at the part of the rotor head adjacent the port plate 7, as shown in Figures 4 and 5, but these reductions do not extend the full length of the head, part of which is full diameter between vane slots as shown in Figure 10 in order to provide ample sealing surface between the annular recess 8b, and the variable capacity chambers.

The fitting of the guide ring 11 between the port plate 7 and the motor housing 8 and between the two faces at the top and bottom of the pressure housing 10 forms a substantially fluid tight seal. The chambers on each side of the guide ring between the guide ring and the pressure housing are termed control chambers, since the position of the guide ring may be controlled by admitting fluid under pressure to one of these chambers while permitting fluid to escape from the other.

A slide valve 13, having two necks 13a, is fitted in two aligned bores in the two lower extensions of the pressure housing 10, and the ends of the bores are sealed by plugs 14, which also retain springs 15. Two small ducts 10c place the plugged end of each bore in restricted communication with the adjacent control chamber. Two larger passages 10b connect a mid point of each bore with the adjacent control chamber, and two passages 10d extend through the pressure housing 10 and intersect the bores also at these mid points. When the slide valve 13 is in central position the intersections of passages 10b and 10d with the bores are almost covered by the valve, but there remains a restricted passage between each 10b passage and the adjacent 10d passage. When the slide valve 13 is moved to the left, the right hand 10b passage is placed in relatively unrestricted communication with the right hand 10d passage through one of the necks 13a, while the communication between the left hand 10b passage and the left hand 10d passage becomes virtually nil. When the slide valve is moved to the right, the reverse effect takes place. The passages 10d communicate with aligned passages in the port plate 7, and are interconnected on the motor housing side of the pressure housing by means of recess 10e.

A control valve 16 of hollow construction is slidable in and extends through the guide ring 11, and through the pressure housing 10, as shown in Figure 5, and has ports 16a which are normally just within and covered by a portion of the guide ring 11. Another set of ports 16b is located similarly in control valve 16 at the opposite side of and also normally just covered by the guide ring 11. The ports 16a and 16b are in communication with additional ports 16c through the hollow center of the control valve, which also provides a passage to a cap 17 which is perforated to complete this passage, and has a shoulder which forms a seat for a spring 18. An outer housing 19 has a hollow projection adjacent this end of the control valve. A plug 20 is threaded therein and is tapped for the installation of an adjustable stop screw 21 and lock nut 22. In Figure 5 the cap 17 is shown in contact with the stop screw 21, as the motor control valve is here shown at the extreme right hand end of its sliding range. The pump is not equipped with any stop of this character, but has a similar cap and spring.

At the uppermost portion of each control chamber a small diameter passage 10a extends through the pressure housing 10 from the control chamber to the outside of the pressure housing.

In the port plate 7 are two ports 7b and 7c which are helical in form. It should not be inferred that they take the form of a portion of a true helix, but rather that this description characterizes the shape, which is shown in Figure 5. The arrow in this figure indicates the direction of rotation of the pump rotor and the prime mover, and the normal direction of rotation of the motor rotor. With the rotors turning in this direction, this shape of the ports affords a smoother path for the passage of fluid, as the upper port normally conveys fluid from the pump to the motor, while the lower port returns the fluid from the motor to the pump. This shape also permits larger port area due to the following facts. In operation the guide ring 11 is at times shifted to the left from the position shown in Figure 5 to a position where the bore just clears the outermost portion of the rotor head. As the bore of the guide ring determines the path of the rockers 9, the port outline on the motor side of the port plate must leave a marginal surface on the port plate between the port and the bore of the guide ring when same is at maximum offset, in order to provide a bearing surface for the ends of the rockers 9 to avoid the possibility of rockers sliding into the port and locking the rotor. This condition results in a port outline on the motor side of the port plate as indicated by the solid lines outlining the right hand portions of the ports 7b and 7c as viewed in Figure 5. The helical shape permits the port outline on the pump side of the port plate to be enlarged as indicated by the dotted lines, for in operation the range of movement of the pump guide ring is from a point only slightly to the left of center to a point as far to the right of center as the guide ring of the motor moves to the left of center. The range of movement of the pump guide ring imposes similarly a limitation as to the port outline on the pump side of the port plate, and the shaping in this case allows the port outline on the motor side of the port plate to be increased. The shaded areas 7d and 7e represent the increase in port area on the motor side of the port plate made possible by the helical shape and the shading serves to indicate slope of the surface between the pump side and the motor side of the port plate. A similar slope exists in each port between the solid and dotted lines outlining the port openings on the right hand side of Figure 5, and these two slopes give the port openings their helical character.

It should be noted that the reduced diameter of portions of the rotor head between vanes adjacent the port plate permits a substantial and effective increase of the port areas without interfering with the support of the vanes at the outermost possible point. The positions of the ends of the port openings are determined by requirements of timing, which are well known to those skilled in the art.

There are two shallow recesses 8c in the face of the motor housing 8. These are similar in outline to the ports in the port plate, but somewhat smaller in order to leave ample surface for the shoulder face of the rotor head to bear against. The pump housing has two similar recesses.

The pump pressure housing, the port plate 7 and the motor pressure housing 10 are clamped between the pump housing 23 and the motor housing 8 by means of cap screws. Some of these cap screws are threaded into the pump housing 23, thus holding the transmission together as a unit, and others are threaded into the mounting housing 1, thus securing the transmission on its mounting housing. Pins 24 serve to align the parts of the transmission and to align the transmission with the mounting housing. The mounting housing may be affixed to and accurately aligned with the prime mover by any suitable means, or if more convenient this accuracy of alignment may be dispensed with a flexible coupling used between the prime mover shaft and the input shaft of the transmission.

The outer housing 19 surrounds the port plate and the pressure housings of the pump and the motor, and is clamped between the pump housing 23 and the motor housing 8, with joints sealed by means of gaskets 25.

It should be noted that the form and arrangement of the group of parts comprising the pump housing, the motor housing, the port plate, the two guide rings, the two pressure housings, and the outer housing, provide a construction that permits the ways in which each guide ring is mounted to also form a complete sealing surface between the two control chambers without the necessity of accurately matching corner radii on the guide ring to corner radii at the junctions between the pressure housing and the journal carrying housing as would be required if these two elements were formed integrally. The construction used also facilitates the finishing of other surfaces accurately to size, as the faces of the pump and motor housings, the pressure housings, the guide rings, and the port plate may be economically ground to extreme accuracy a number of pieces at a time on commercial surface grinders. The ground faces of the port plate, the two pressure housings and the pump and motor housings are clamped together without gaskets to form an effective high pressure seal. Any leakage through these joints is gathered in the outer housing where leakage is avoided as the gasket fitted joints between the outer housing and the pump housing and motor housing are not subjected to pressure.

In the pump housing 23 there is a recess 23f of sufficient size to always be in communication with one of the recesses 26c in the pump rotor 26. A passage 23g, sealed at its inactive end by a plug 27, places the recess 23f in communication with one end of a bore 23h in which is fitted a piston valve 28. The opposite end of the bore 23h is placed in communication with the central lower portion of the active fluid chamber of the pump by means of a passage 23i. The central portion of the bore 23h is placed in communication with the recess in the pump pressure housing corresponding to the recess 10e in the motor pressure housing, by means of passages 23j and 23k. The recess 23f is in communication with one recess 26c in the lower side of the pump rotor and through the passages in the rotor is in communication with one of the variable capacity chambers in the upper side of the active fluid chamber in the pump, and therefore also in communication with the port 7b in the port plate 7. The port 7c communicates with the passage 23i through the lower portion of the active fluid chamber of the pump, therefore the position of the piston valve 28 is regulated by the relative pressures in ports 7b and 7c, since these pressures bear on the ends thereof. The piston valve covers the entrance to the passage 23j only when in substantially central position, and is moved from central position by any difference in pressure in ports 7b and 7c. The piston valve 28 should be a fairly loose fit in bore 23h, thereby when there is no difference in fluid pressures in the two sides of the active fluid chamber, a portion of such pressure as prevails in the active fluid chamber is transferred to the passages 23j and 23k.

The passages 23j and 23k are thus maintained continuously in communication with whichever of the ports is at higher pressure, hence these passages and the other passages which are in unrestricted communication therewith are termed the polarized pressure passages and are maintained continuously under fluid pressure substantially equal to the highest pressure existing in any part of the active fluid chamber of the transmission, which comprises the ports 7b and 7c and the active fluid chambers of the pump and the motor.

A pipe 29 connects the passage 23k with a regulating valve 30 which is connected by a pipe 31 to the annular recess 23a in the pump housing 23. The central stepped bore 2k and an equivalent stepped bore in the pump rotor 26, and the annular recesses 23a, 23b, 8a and 8b and their connecting passages, and a large central aperture 7a in the port plate 7, are all in communication with the pipe 31. These connected passages may be termed the central pressure passages and may be maintained at a suitable pressure substantially proportional to and less than that prevalent in the polarized pressure passages by means of the regulating valve 30. The pressure in the central pressure passages acts against the inward faces of the vanes and may be adjusted to such portion of the working pressure in the active fluid chamber as is required to maintain the vanes in proper position against the action of the working pressure, a portion of which is effective to force the vanes inward. This feature is of importance in operation at low speeds and high pressures, where centrifugal force is insufficient to maintain the vanes in position.

A pipe 32 connects with the upper portion of the motor housing 8 and through passage 8d communicates with recesses 2c of motor rotor 2 as the rotor turns. A pipe 33 connects with the lower portion of a leakage collecting groove 8e. The pipes 32 and 33 join at a fitting 34 and a pipe 35 connects this fitting to a fitting 36 in the bottom of the outer housing 19. Equivalent pipes connect the two corresponding bosses on pump housing 23 to the fitting 36. A pipe 37 connects the fitting 36 to the oil sump of the prime mover. A pipe 38 connects to the outlet of the lubricating oil pump of the prime mover by suitable means, and connects to the check valves 39 and 40 which close against flow of oil into the pipe 38.

Small cylinders 41 and 42 are integral with an extension 19b of the outer housing 19. The cylinder 41 is connected by a pipe fitting 43 to the check valve 39 which is joined by a pipe 44 to a fitting 45 communicating with the lower portion of the active fluid chamber. Similarly the cylinder 42 is connected by a fitting 46 to a pipe 47 connecting to the check valve 40 which is joined by a pipe 48 to a fitting 49 communicating with the upper portion of the active fluid chamber.

The cylinders 41 and 42 are fitted with pistons 50 and 51 which act against the ends of a cam plate 52 which is slidably mounted in the extension 19b of the pressure housing 19. The cam plate 52 is movable from the position shown in Figure 3 to a point beyond the position shown in Figure 7.

The control valve 16 and a control valve 53 of the pump are governed by cams formed on the cam plate 52 as shown in Figures 3 and 7.

The control valve 53 of the pump has the same features of construction as the control valve 16 of the motor. The guide rings are maintained in substantially fixed positions in relation to the ports in these control valves by fluid pressure as hereinafter described. The spacing of the ports from the cam-contacting ends of these valves is such as to bring the guide rings of the pump and motor into the desired respective positions in relation to the two cams on cam plate 52. By suitably proportioning the cams, the valves 16 and 53 may be identical.

The cam plate 52 has a face 52a formed on the side opposite the two cams. This face is adapted to be acted against by a pin 54, affixed in an arm 55, which is integral with a shaft 55a which is journaled in a hollow shaft 62 which is journaled in a cam plate cover 57. The cam plate 52 has also a face 52d against which a pin 60, also fastened in the arm 55, may act.

The hollow shaft 62 carries an arm 62a in which is affixed a pin 61. The cam plate 52 also has formed thereon two faces 52b and 52c against which the pin 61 may act. Journaled on the shaft 62 is an arm 63 adapted to act upon another arm 64 through the action of a spring 65. A pin 66 is fastened in the arm 64 and acts against the arm 63 to hold the spring 65 in initial tension and to prevent the arm 64 from advancing under spring action beyond the desired point. It also permits the arm 63 to move the arm 64 in the direction opposite that in which the spring 65 is adapted to be operative. The arm 64 is keyed to the hollow shaft 62, thus acting upon the arm 62a and the pin 61. In the end of the arm 63 is pivotably affixed an eye pin 67, through the eye of which passes a rod 68 threaded at the end and fitted with two castellated nuts 69 and 70. A spring 71 is held under compression between the nut 70 and the eye-pin 67.

The rod 68 is pivotably fastened at its opposite end in an arm 72, which carries integral supports for a headed pin 73 and a spring 74 which is adapted to force the pin 73 into notches in a sector 75 mounted by any suitable means (not shown) in proper relation to the pin 73 and to a shaft 76 to which the arm 72 is keyed. The shaft 76 is journalled in suitable mountings (not shown) and has keyed thereto a hand lever 77 which governs, in normal operation, the action of the pin 61 against the faces 52b and 52c of the cam plate 52, through the mechanism described.

A foot pedal 78 is journalled on the shaft 76 and acted upon by a tension spring 79, anchored at one end on a suitable fastening indicated at 80. Pivotably connected to the lower end of the foot pedal is a rod 81, also pivotably connected to an arm 82 which is journalled on the shaft 55a and which actuates, through the action of a spring 83 an arm 84. A pin 85 fastened in the arm 84 and operable against the arm 82 acts to keep the spring 83 in initial tension, to keep the arm 84 from moving beyond the amount determined as maximum by the movement of the arm 82, and to return the arm 84 when the arm 82 is returned by the action of the spring 79 through the foot pedal 78 and the rod 81. The arm 84 is keyed to the shaft 55a thus acting on the arm 55 and the pins 54 and 60. The pin 66 in the arm 64 extends into the arc of action of the arm 82 which is thus operative to turn the arm 64, the hollow shaft 62 and the arm 62a in a counter clockwise direction, thus moving the pin 61 away from the face 52b. A stop 86 prevents the foot pedal 78 from causing the pin 61 to be moved into contact with the face 52c.

At the pivot center of the arm 55 there is a small raised portion which bears against the cam plate 52 holding it in position in the ways provided in the outer housing 19.

The structure described has numerous unique functions contributing to the objects and utility of my invention.

The vane construction permits a large travel of the vanes in the rotor; the full width portions maintaining the seal, and the narrow extensions forming a guide to prevent the prohibitive binding action that would occur if an equal length of travel were used without these extensions. The thickness of the vanes is sufficient to keep these extensions from deflecting under load beyond a permissible amount such as would not cause binding effect to result. The extensions permit a vane travel about double that which could be used with an equal minimum engaged length of bearing with conventional vanes, with a corresponding effect on the fluid displaced per revolution with a pump or motor of a given size. This permits the transmission of almost doubled power without increase in working fluid pressure or size, and with virtually no increase in bearing loads, as the bearing load created in a pump or motor of this type is dependent mainly on the fluid pressure and length and diameter of the cylindrical space in which the vanes operate.

The passages in the rotors, between the variable capacity chambers and the recesses, provide means whereby the heavy bearing loads commonly arising in hydraulic transmissions (and increased by any reduction in size attained by general scaling down of dimensions, due to the doubly increased fluid pressures that would be necessitated) may be almost completely balanced out. Each variable capacity chamber creates a bearing load which is individually balanced out by an individual set of recesses and connecting passages. Referring to the motor rotor 2, each variable capacity chamber is placed in communication with a recess 2d in the same quarter and with a larger recess 2c in the diametrically opposite quarter, by means of the passages described. The area of the recess 2c is sufficient to create an opposing force equal to the total of the forces applied by the variable capacity chamber and the connected 2d recess. The 2c recess is also so positioned that the load created in the variable capacity chamber is longitudinally in leverage balance with the load created in the 2d recess referring to the center of the 2c recess as fulcrum. While the loads are thus in leverage balance as to longitudinal position, the line of action of the forces created by fluid pressure in the recesses intersects the axis of the rotor, while the line of action of the forces created by the fluid pressures in the variable capacity chambers substantially intersects the center of the guide ring bore, thus while these forces balance as to angle, amount and longitudinal position, the transverse difference in the locations of the lines of action forms a couple or turning moment corresponding to the torque of the pump or motor.

The importance of individually balancing the loads created in each variable capacity chamber may be realized in connection with the fact that the angle of the resultant of the loads created in the four variable capacity chambers oscillates through an angle of substantially 90 degrees as the rotor turns. At the instant of two of the variable capacity chambers being between parts the direction of the load is in practical terms difficult to define, as slight leakage at the edges of the ports or slight inaccuracy of the port outline may greatly modify the theoretical conclusion, but this condition exists only for the briefest interval. When the rotor has turned a fraction of a degree from this position the two chambers in question are quite definitely in communication with the ports, one with the high pressure port and one with the low pressure port, and the direction of the resultant load is substantially 45 degrees in advance of the vertical center line through the ports. The direction of the resultant now travels in unison with the rotation of the rotor until it reaches a point substantially 45 degrees beyond vertical, at which time the direction jumps almost instantly through the undefined condition to the position substantially 45 degrees in advance of the vertical, and this cycle is repeated every quarter turn of the rotor. Consequently an equal stationary opposing load would fail to maintain balance with this oscillating load, and these two forces would be combined into a new resultant load (applied to the bearing) which would reach a maximum (with these two loads 45 degrees out of opposition) of 35 to 38% of the total of the two loads, or 70% to 76% of the original load.

Even with the large power transmitting capacity in relation to bearing load provided by the unique vane construction, the rotor head of a transmission of suitable capacity and size for a medium weight automobile would be at times subjected to a peak resultant load from the variable capacity chambers of about 9,000 pounds, 70% of which is 6,300 pounds, therefore the importance of substantially complete balancing, with the resultant of the balancing forces oscillating in continuous opposition to the oscillating resultant of the original forces is apparent. This result is obtained by individual balancing of the forces from each variable capacity chamber, each rotating force being continuously opposed by a balancing force rotating in unison.

It should be noted, however, that the balancing does not eliminate the value of the reduced ratio of bearing load to power transmitting capacity made available by the vane construction. To maintain equal power transmitting capacity without increase in diameters or fluid pressure with the conventional vane construction, the length of the rotor head and the initial bearing load would be doubled. As the shaft diameter of the middle portion is about maximum its length would have to be doubled to provide sufficient area of recesses, thus both length and load would be doubled, and the deflection would be roughly sixteen times as great. Such an increase in deflection would almost completely nullify the effectiveness of the pressure balancing arrangements, as the deflection would exceed the running clearance and would cause much of the load to be concentrated on parts of the small marginal surfaces of the journal adjacent the shoulder face of the rotor head. On the other hand, with the arrangement I have provided the deflection is so slight as not to interfere with the thickness of the oil film and the pressure can be so nearly perfectly balanced as to leave only a very small residual pressure to be carried on the entire marginal surfaces surrounding the recesses.

The foregoing has dealt only with radial loads. There are some other loads which my construction makes provision for partially balancing. When the vanes pass the ports 7a and 7b the edge faces are exposed to the pressures in the ports, while the fluid pressures against the surfaces in sliding contact may tend to work down towards absolute zero, as occurs to cause gage blocks to adhere to each other under the influence of atmospheric pressure applied to the exposed faces. The recesses 8c tend to balance any forces so created.

The edge faces of the vanes from the annular recess 8b inward are subjected to the pressure prevalent in the central pressure passages, and the aperture 7a in the center of the port plate 7 is made large to subject considerable area of the opposed edge faces to the same pressure. This exposes much of the rotor head to this pressure, which is substantially balanced by the same pressure applied to the shoulder formed in the rotor at the annular recess 8a.

The bore of the guide ring 11 is subjected to the pressures prevailing in the variable capacity chambers, and the angle of the resultant force varies through approximately 90 degrees, as it is always substantially opposite in direction and equal in amount to the resultant of the forces applied to the rotor head by the pressures in the variable capacity chambers. This may result in a maximum horizontal component of about 6,300 pounds, tending to traverse the guide ring. As the motor rotor may be stopped and in such position as to place the resultant as much as 45 degrees from vertical, it is apparent that a force exceeding 6,300 pounds may be necessary to insure traversing the guide ring in either direction at will. This force is available through the action of the control chambers and the passages and valves associated therewith, which provide means for supplying fluid under pressure from the polarized pressure passages to either of these control chambers. Since the projected area of the guide ring exposed to this pressure is considerably greater than the projected area of the bore exposed to internal pressure, and the pressure in the polarized pressure passages is substantially equal to the highest internal pressure, it is evident that ample force is thus made available to traverse the guide ring, yet extreme pressure is only available when needed, that is when internal pressure (and possible resistance) is high.

Admission of fluid to the control chambers of the motor is regulated by an automatic selector valve arrangement comprising the slide valve 13, and associated passages. Outlet of fluid from the control chambers is regulated by the control valve 16, which governs the movement of the guide ring, and yet is not itself exposed to any unbalanced fluid pressures, and therefore may be moved by applying only sufficient force to overcome the friction of sliding this small valve through the bores in which it is fitted. Since the function of spring 18 is only to overcome this friction and thus to maintain the end of the control valve 16 in contact with the cam on cam plate 52, this spring may be very light. When the control valve 16 is moved to the left (Figure 5) the ports 16b are uncovered, permitting fluid to flow through the hollow center of the valve and out through ports 16c and cap 17. This reduces the pressure on the left side of the guide ring, which causes both the guide ring 11 and the slide valve 13 to move toward the left. Since the springs 15 are very light, the slide valve 13 moves quite easily, the speed being dependent on the diameter of passages 10c. The guide ring might not move as readily on account of internal pressure reactions, but the movement of the slide valve 13 to the left forms an easier path on the right for the passage of oil from the polarized pressure passages into the right hand control chamber, and closes the corresponding passage on the left hand side. This causes the pressure in the polarized pressure passages to be very nearly maintained in the right hand control chamber, while the pressure in the left hand control chamber is reduced virtually to atmospheric, thereby positively and quickly traversing the guide ring 11 through a powerful relay action and very slight controlling force.

When the guide ring has moved sufficiently to again cover the ports 16b the pressure in the left hand control chamber rises because of the closing of the outlet, but this alone might not equalize the pressure in the two control chambers, as the inlet to the left hand chamber is still closed and might remain closed due to the action of the unequal pressures through the small ducts 10c being greater than the strength of the springs 15, but in this case a very minute over-running of the guide ring in relation to control valve 16 would equalize the pressures and permit the springs 15 to centralize the slide valve 13. Since the projected area of the guide ring is about 100 times that of the end of the slide valve 13, and over-run of .002" will move the slide valve about .200", an amount sufficient to return it to center. Any tendency of the guide ring or slide valve to oscillate may be effectively damped by the resistance offered by the small ducts 10c to the rapid passage of oil. When the control valve 16 is moved to the right the guide ring is similarly forced to follow. To insure rapid and accurate operation as described the passages 10a are quite small, the leakage from the control chambers is made as small as practicable, and restricted passages across slide valve 13 when same is in central position are provided. These restricted passages are made considerably larger than the combined outlet passages including leakage, in order to provide a substantial initial pressure in the two control chambers whereby opening an outlet from one chamber will insure a sufficient difference in pressure in the two chambers to positively actuate slide valve 13.

The purpose of the passages 10a is to gradually exhaust any air or vapors gathering in the control chambers, which will naturally rise and collect below these passages. Due to the difference in viscosity, any air or gasses so collected will escape much more rapidly than the oil will escape when no air is present.

The displacements of both the pump and the motor are controlled by the relay or servo action above described, each through individual guide rings, control valves and automatically actuated slide valves, but both from the same polarized pressure passages.

The displacement of either unit is substantially proportional to the eccentricity of the guide ring bore in relation to the rotor. The movements of the two guide rings are regulated through the movements of the control valves 16 and 53 as governed by the cams on cam plate 52. In the example of my invention herein disclosed these elements are so proportioned that when the pump guide ring is at the extreme right hand portion of its range the guide ring of the motor is substantially concentric with the motor rotor. (See Figures 3 and 5.) As cam plate 52 is moved from the position shown in Figure 3 to the position shown in Figure 7, the displacement of the pump is reduced and the displacement of the motor is increased. When it reaches the position shown in Figure 7 the displacement of the pump is substantially zero while that of the motor is at maximum. Further movement of the cam plate in the same direction causes the guide ring of the pump unit to take a position eccentric to the rotor on the side opposite that shown in Figure 3, thereby reversing the displacement of the pump and causing it to deliver fluid to the lower port 7c in the port plate, thus causing the motor to rotate in reversed direction. During this further movement of the cam plate, the end of the motor control valve rides on the flat portion or dwell of the cam which controls motor displacement, therefore the motor displacement remains fixed at maximum value while the pump unit goes into the reversed delivery function described.

The speed of rotation of the motor in relation to the speed of rotation of the pump is equal to the displacement of the pump in relation to that of the motor. Therefore when the displacement of the pump is zero, the input or pump shaft may be rotated without causing rotation of the output or motor shaft, but this shaft is locked from turning (excluding the effects of leakage) as the motor is at maximum displacement at this time. Conversely, when the displacement of the motor is zero the output shaft may turn freely without rotation of the input shaft, but the input shaft becomes virtually locked since the pump is at maximum displacement at this time. Excessive pressures in the hydraulic transmission resulting in dangerous strains on parts of the transmission and also on mechanism connected thereto may result if either of these shafts are permitted to become locked in this way while rotating and connected to elements having high momentum. The unique control mechanism embodied in my transmission permits either unit to be brought to zero displacement for certain functions but only under conditions such that dangerous pressures and strains cannot result.

This control mechanism comprises the cam plate 52 and the associated elements. The functions of the elements which translate movement of the cam plate into variations in displacement have been explained. Movement of the cam plate may be brought about through several different means, which operate to influence or regulate the position thereof. When the hand lever 77 is in the "neutral" position shown in Figure 1 and the foot pedal 78 is released, thereby assuming the position shown in Figure 1, the connecting elements operate to place the pins 54, 60 and 61 in the positions shown in Figure 8. With the pins in these positions, the cam plate 52 is free to move under other influences from the position shown leftward until the face 52a strikes the pin 54, at which time its position is as shown in Figure 3. The pistons 50 and 51 act against the ends of the cam plate to affect its position by means of the difference in fluid pressure between the upper (normally high pressure) side and the lower (normally low pressure) side of the active fluid chamber of the transmission. When the pump is delivering fluid in the normal direction pressure is created in cylinder 42 acting on piston 51 to move the cam plate 52 away from the cylinder 42. If no appreciable resistance is offered, as in the case of pins 54, 60 and 61 being in the positions shown in Figure 8, the cam plate will move to the right until the displacement of the pump is reduced to zero. On the other hand, if the pump were delivering fluid in the reverse direction, pressure would be created in cylinder 41 acting on piston 50 to move the cam plate in the reverse direction, thereby bringing the reversed delivery to zero. Thus the control mechanism automatically places the pump on exactly zero displacement when the hand and foot controls are placed as above, with the motor rotor stationary and the pump rotor turning in normal direction. This obviates the need of any other means to prevent "creeping" of the vehicle, a trouble commonly experienced with other hydraulic transmissions wherein creeping usually results due to inaccuracy in the means of setting the pump on zero displacement. A slight clearance is provided between pin 61 and face 52b when the pump is at zero displacement, which allows freedom for this automatic adjustment to take place. The light spring which holds the pump control valve against the cam tends to force the cam plate toward the cylinder 41, which corresponds to a reverse pump delivery, but this spring is so light that the piston 50 will overcome its pressure and place the pump on zero displacement before sufficient fluid pressure is created in the transmission to place the vehicle in motion.

When the driver of the vehicle wishes to proceed forward, he pulls the hand lever 77 backward until pin 73 on arm 72 nests in the notch 75a in sector 75 where it is held in place by the action of spring 74, which is made sufficiently strong to hold the arm 72 and the lever 77 in place against the action of the spring 65 when same is at its maximum deflection; but not so strong as to offer serious resistance to manual movement of lever 77. Bringing the lever 77 to this position turns the arm 63 in a clockwise direction and through the action of spring 65 causes the arm 64, the shaft 62 and the arm 62a to tend to turn in the same direction. This tends to bring pin 61 downward and forward along an arc struck from the axis of shaft 62, thus urging cam plate 52 to move toward cylinder 42. However if the pump rotor is turning, movement of the cam plate in this direction will cause pressure to rise in cylinder 42 due to the pump displacement being created by this movement. Consequently the position which the cam plate takes is such that the pressure from piston 51 acting under the fluid pressure in cylinder 42 is substantially equal to the opposing pressure created by the action of the pin 61 on face 52b as urged by the spring 65. This opposing pressure is dependent on the angle of a line drawn through the centers of shaft 62 and pin 61 in relation to the ways in which the cam plate slides. Calling this angle alpha, the tangential force required at the pin 61 to secure a certain force opposing the piston 51 is equal to sine alpha times this opposing force if surface 52b is perpendicular to the ways, and the effects of friction are neglected. Allowing for friction the tangential force becomes equal to sine alpha times the opposing force, plus or minus K cosine alpha times the opposing force, which relation may be expressed as the equation $$F_t = F_0 (\sin \alpha \pm K \cos \alpha)$$

where K is the coefficient of friction between the pin and the face, $F_t$ the tangential force at pin 61, and $F_0$ is the force opposing the action of the piston 51. The plus or minus sign applying to the second term of the equation is determined by the direction of motion.

The tangential force at the pin 61 is also substantially proportional to the angular deflection of the spring 65 from its free position. Consequently within the elastic limit of the spring, any change in the tangential force applied to the pin 61 is accompanied by a proportional change in its angular position, as the arm 63 holding the opposite end of the spring 65 is in fixed position during the phase of operation being described.

When the pump displacement is zero, alpha is about three degrees if the pin 61 is in contact with the face 52b, as there is a slight clearance when alpha is zero. When the pump displacement is maximum alpha is about 60 degrees.

When the pump displacement is near maximum a given small change in the pressure in cylinder 42 will bring about a certain change in the tangential force at pin 61. When the pump displacement is somewhat less the same small change in pressure will bring about less change in the tangential force at pin 61, since alpha is less and the quantity (sin alpha ± K cos alpha) is also less if K is within reason. As the pump displacement is continuously reduced from maximum to nearly zero there is a continuous reduction in the change in tangential force at pin 61 corresponding to a certain small change in the pressure in cylinder 42. As the change in angular position of pin 61 is substantially proportional to the change in tangential force, it follows that the angular movement of pin 61 corresponding to a given change of pressure in cylinder 42 continuously decreases as the pump displacement is decreased from maximum to approximately zero. Since the change in pump displacement corresponding to a given angular change in the position of pin 61 also reduces continuously as the angle alpha is reduced, there is a double effect whereby the change in pump displacement corresponding to a given change in fluid pressure is comparatively large when the pump displacement is near maximum and greatly reduced when the pump displacement is near zero.

By varying the ratio of initial tension to final tension of spring 65, and also the angular range of action of pin 61, it is possible to secure a relationship between the pressure in cylinder 42 and the corresponding pump displacement such that the product of fluid pressure times pump displacement remains fairly constant throughout the major portion of the range of the pump displacement used in the "forward setting of the hand lever. Since the pressure in cylinder 42 is the same as that against which the pump is delivering, the torque required at the pump shaft or input shaft may be thus caused to be equally constant throughout this range. It is not usually desirable to maintain constant input torque below a pump displacement of about one fifth of maximum, as this will result in a corresponding output torque more than ample for all usual maximum requirements, and attempting to maintain constant input torque below a certain minimum pump displacement causes the corresponding fluid pressures to rise to values requiring otherwise unnecessary strengthening of parts. The torque at the small displacement end of the range may be controlled by adjusting the angle alpha corresponding to zero pump displacement. The angle of approximately 3° here used limits the peak oil pressure under this forward phase of operation to a suitable value. The shape of face 52b on cam plate 52 may be modified to form a cam to so modify the pump displacements corresponding to the various fluid pressures as to bring about almost perfect constancy of input torque over any desired range, or the same result may be secured by modifying the shape of the cam which directly actuates the pump control valve 53.

The two notches 75a and 75b in the forward part of the sector 75 are for the purpose of providing a variation in the input torque of the transmission when required. The notch 75a in the extreme position is intended to be used for all ordinary driving, while the adjacent notch 75b is used in the event that due to coldness or any other cause the prime mover is temporarily unable to deliver its normal torque.

The strength of spring 65 may be changed without changing its ratio of initial load tension to final tension to change the value of the constant input torque to suit the power of any prime mover within reasonable range, or the value of the input torque may be adjusted by leaving the spring unchanged and varying the bore of the cylinder 42. The value of the constant input torque should be adjusted to a fair load for the prime mover, that is about 70% of the torque delivered by the prime mover when operating at moderate speeds with wide open throttle.

Through the means of this automatic control mechanism, when the driver of the vehicle desires to increase its speed it is only necessary to open the throttle until the prime mover torque exceeds the input torque of the transmission. This will result in increased prime mover speed, and a simultaneous increase in the ratio of the transmission, that is an increase in the ratio of the input shaft speed to the output shaft speed. Greatly increased power is thus applied to the vehicle wheels, and very rapid acceleration results. The rapidity of acceleration is due to the fact that the ratio in use is always just the right one to best match the ability of the prime mover to the speed of the vehicle and also to the fact that the power is being continuously and effectively applied while the ratio is being changed.

When the desired speed has been reached a slight closing of the throttle reduces the prime mover speed as desired. Since the input torque of the transmission is virtually constant, the horse power delivered to the vehicle wheels is substantially proportional to the prime mover speed. As the horse power required to maintain vehicle speed once reached is quite low except at very high speeds, the vehicle speed can be maintained at reasonable highway speed with the prime mover turning at relatively very low speed. If the prime mover is now throttled down to idling speed the oil pressure in cylinder 42 is momentarily entirely relieved, and spring 65 will act to cause pin 61 to move the cam plate toward cylinder 42 until the face 52a almost touches the pin 54. This causes the pump displacement to be increased to almost maximum, and the motor displacement to be reduced to nearly zero, whereby the vehicle wheels may turn freely, without retarding effect. The cam plate 52 does not move quite far enough to place the motor on zero displacement, as when its displacement approaches zero the outlet of the pump as driven slowly by the idling prime mover becomes sufficiently restricted to cause the pressure to again rise, thus causing cam plate 52 to assume such a position as to cause the motor to have just sufficient displacement to accept the quantity of oil delivered by the pump, thereby applying small power at high speed to the vehicle wheels, with the prime mover turning very slowly. If the prime mover is completely stopped the motor will go to zero displacement, unless the stop screw 21 is so adjusted as to stop the motor control valve 16 before it can place the guide ring on exact central position. By means of this stop screw the transmission may be so adjusted as to keep the prime mover turning whenever the vehicle is in forward motion, without causing it to turn at more than a fair idling speed even when vehicle speeds are quite high.

It should be noted that zero and approximately zero displacement of the motor are used to great advantage, and yet under such safeguards that dangerous pressures and strains cannot result except from complete locking of the prime mover with the stop screw set to keep it turning. Previous inventors have overlooked or been forced to sacrifice these advantages due to lack of proper safeguards.

When the driver desires to retard the vehicle either for the descent of grades or reducing speed he may do so without the use of the usual brakes by simply depressing foot pedal 78 thereby moving the arm 82, and causing the spring 83 to act on the arm 84, the shaft 55a and the arm 55, tending to turn them counter-clockwise. This places pin 54 against face 52a of the cam plate, tending to move same toward the cylinder 41. Too sudden movement of the cam plate is prevented by oil pressure in cylinder 41 acting on piston 50 to balance against the action of spring 83. Increase of the motor displacement and reduction of the pump displacement while the vehicle is in motion and the prime mover idling will cause the pressures in the active fluid chamber of the transmission to reverse, that is the lower portion including the port 7c then becomes the pressure side, and pressure is thus conveyed to cylinder 41. The action in this case is similar to that which takes place when pin 61 is co-acting with piston 51 and cylinder 42 to regulate the pump displacement in such a way as to maintain virtually constant input torque. Here the pin 54, the cylinder 41 and the piston 50 coact to maintain the motor displacement in such relation to oil pressure as to maintain a fairly constant braking action throughout the range of motor displacement, with the foot pedal fully depressed. Thus regardless of vehicle speed or the amount of manual effort that may be applied in an effort to further depress the pedal 78, the retarding effect produced is limited to a definite maximum. The spring 83 may be so proportioned as to provide a retarding action just within the strength of the rear end drive, or considerably less, for instance just enough so that skidding will not ordinarily take place on wet pavement. If the pedal is not fully depressed the retarding action is reduced. The action of the spring 83 prevents the dangerous fluid pressures and strains which would result if the pump were brought toward zero displacement too rapidly with the vehicle in motion.

The pedal 78 may be used both as a clutch and a brake. By the use of this pedal the vehicle may be stopped and held at a traffic intersection without the use of the hand lever 77. When the green light comes up it is only necessary to release pedal 78, still without touching the hand lever 77, and step on the accelerator. The selection of proper ratio and shifting from ratio to ratio as the vehicle speed picks up are all under automatic control as soon as the foot pedal is released.

While the foot pedal is depressed with the hand control in "forward" the arm 82 acts against the pin 66 in the arm 64 to positively disengage the pin 61 from contact with the face 52b of the cam plate, thus placing the movement of same only under the influence of pin 54 and piston 50. Therefore the spring 83 is relieved from acting against the spring 65 through the medium of the cam plate and pins, thereby the same braking effort at the vehicle wheels is available whether the hand lever is in "neutral" or "forward" position.

To proceed in "reverse" the hand lever 77 is shifted to bring into use the notch 75d in sector 75. The rod 68 then acts through spring 71 to urge the arm 63, the pin 66, the arm 64, the shaft 62 and the arm 62a to turn in a counter-clockwise direction. This causes the pin 61 to apply pressure against face 52c, thus urging the cam plate 52 toward the cylinder 41, maintaining the motor at maximum displacement and causing the pump displacement to be reversed, thus delivering fluid to the lower portion of the active fluid chamber. This applies fluid pressure to piston 50 in the cylinder 41, thus preventing creation of undue fluid pressure by the action of this piston in preventing too rapid an increase in reversed pump displacement under the influence of the spring 71. Again braking action is available by use of the foot pedal 78, which in this case causes pin 60 to act against the face 52d of cam plate 52 to move same toward the position of zero pump displacement. The spring 83 again protects against excessive fluid pressure. The pin 60 operates on a shorter radius than the pin 54, as in this case the use of the pedal does not relieve the initial spring pressure on the cam plate, and the spring 83 must act against both spring 71 and piston 51 to retard the vehicle. As the movement required is less, the shorter radius of action of pin 60 affords a simple solution.

To prevent "creeping" of the vehicle when held at rest by the foot pedal with the hand lever in "forward" setting, the arms, pins, foot pedal stop, etc., are so proportioned that when the foot pedal is depressed to its stop, the final position of the pins 54 and 60 is such as to leave a slight freedom for the automatic adjustment to zero displacement to take place, with the pin 61 also in a position permitting this adjustment to take place.

If the transmission is connected to the oil pump of the prime mover to receive its leakage make-up, the motive fluid is necessarily oil. Oil which escapes from the active chamber of the transmission is drained into the oil sump of the prime mover and returned under the pressure maintained by the prime mover oil pump, normally through check valve 39 to the lower side of the active fluid chamber. This is also in normal operation the low pressure side, and by maintaining a supply of oil under pressure feeding the low pressure side the tendency for air to be drawn into the active chamber due to vacuum created in the low pressure side is eliminated. When the pressures are temporarily reversed from normal, during retarding or reversing phases of transmission operation, the check valve 40 maintains this replenishing action and minimum pressure in the upper side of the active fluid chamber. The check valves act to prevent backing of oil from the transmission into the prime mover.

The pressure of the oil thus supplied maintains some pressure in the active fluid chamber of the transmission whenever the prime mover is running. This supplies, through the aforementioned leakage past the piston valve 28, initial pressure in the polarized pressure passages for moving the pump guide member from an exactly concentric position to a position slightly off center, after which the pressure generated by the pump is added to that provided by the make-up oil supply to form the total pressure in the polarized pressure passages.

Such pressure as may exist in the low pressure side of the transmission due to this action of the prime mover oil pump has no effect on the maintenance of constant input torque and other characteristics as described in connection with the control mechanism, as the torque is determined by the difference in oil pressures between the high and low pressure sides, and the forces applied by pistons 50 and 51 to the cam plate 52 are also determined by the difference in pressures between the high and low pressure sides. In other words the fluid pressures referred to in connection with the control mechanism have been in every instance the fluid pressure in the side referred to over and above that existing in the other side of the active chamber.

If any small bubbles of air should be entrained in the oil which is supplied to the transmission to replenish leakage they are collected and extracted by novel means. Centrifugal action of the rotating oil in the active chambers of the pump and motor causes the air to be forced inward toward the axis of the rotors. Referring to the motor rotor, the beveled entrances to ports 2e are the points in the variable capacity chambers nearest the axis of the rotor, therefore air bubbles entering these chambers gather in these bevels, pass through the ports and enter passages 2f. Due to the slope of passages 2f as shown in Figure 4, these bubbles work down to the portion of passages 2f adjacent section 10—10 where they enter the transverse passages 2h shown in Figure 10. These passages are made small in diameter so that a small amount of oil flowing therein is capable of carrying air bubbles along with the oil to the outside against the action of centifugal force. Thereby the air bubbles enter the recesses 2c and the passage 8d and thence pass with the escaping oil into the prime mover oil sump. The passage 8d is adjacent the transverse passages shown in Figure 10, so that these air bubbles may pass as directly as possible from the transverse passages into the passage 8d. This passage must be large enough to permit sufficient oil circulation through the transverse passages to carry the air bubbles along as described but should not be unnecessarily large. A moderate loss of pressure in the 2c recess which is in communication with the 8d passage does not interfere seriously with the balancing of bearing pressures, since in normal operation the 8d passage communicates with the 2c recess which is in communication with the low pressure side of the active fluid chamber, while a moderate out-of-balance condition during reverse and retarding phases of operation is not regarded as serious. During these phases of operation the action of these passages in removing air will be greatly increased at slight expense of power transmitting efficiency, as oil from what then becomes the high pressure side passes through these passages greatly increasing the rate of the flow therein.

Use of the prime mover oil circulating pump to replenish the leakage and maintain the low pressure side of the transmission under pressure has several advantages over the use of a separate pump for the same purpose. These include the elimination of course of one pump, the possibility of using one oil filter and one oil cooler for both the prime mover and the transmission, and the advantage of a single draining and refilling taking care of both units.

This transmission has been shown and described as designed for use in an automobile, since such an installation appears to make best use of the many advantageous features of the invention and to afford the best means of illustrating the practical use of the various operational characteristics.

There is an important basic difference between my control mechanism and prior devices designed to eliminate excessive pressures. Previous devices are defective in that if the manual control is rapidly moved, it may over-actuate the element having positive control of displacement, then after excessive pressure has been so created, a fluid responsive element acts to correct the over-actuation. The over-actuation may have far exceeded the permissible movement, making it necessary for fluid to flow into the fluid responsive element and for this element to move a considerable distance to correct the over-actuation of the displacement controlling element. During the short but inevitable time required for this movement, allowable pressures may be greatly exceeded with disastrous results. With my control mechanism, the two pistons 50 and 51 and the cam-plate 52 move as a single element positively governing the displacement of the pump and motor in predetermined relation to the movement of this element. The manual controls do not affect this relation, but only influence the movement of this element and the corresponding displacement as predetermined by this relation. When the maximum fluid pressure which it is desired to allow has been reached the spring interposed between the manual control and this element is forced to yield under the pressure applied by the fluid responsive element. No change in displacement takes place except under simultaneous coaction of the spring and the fluid responsive element regardless of the rapidity or extent of movement of the manual control, thus excessive fluid pressures are prevented rather than relieved.

In the embodiment of my invention shown and described in detail herein, the pump and motor rotors are each equipped with four vanes, as this is the preferred construction from the viewpoint of the novel features herein disclosed, and this construction best illustrates the extent of the advantages afforded by some of these features. However, the smoothness of operation is more than proportionately increased by the use of a greater number of vanes, and an odd number is substantially as effective in promoting smoothness as twice as many vanes forming an even number. Thus five vanes are nearly as good in this respect as ten. It is evident that by suitable designing the improvements herein disclosed may be applied to pumps or motors having three, five, six or more vanes.

It is evident that various other modifications in design and proportioning and in the arrangement of the piping, etc., might be made without departure from the important features of this invention and that certain of these features may be applicable with distinct advantages to pumps or motors designed for almost any purpose, even when variation in displacement is not required.

The appended claims are therefore drawn with numerous varied uses of the features of this invention in view.

I claim:

1. In a hydraulic machine, a rotor, a variable capacity fluid chamber rotatable in unison therewith, a recess in the said rotor diametrically opposed to the said variable capacity fluid chamber, and means for communicating fluid pressure to the said recess.

2. In a rotary hydraulic machine, a rotor carrying a variable capacity pressure chamber and a fixed capacity recess, with said chamber and recess disposed on opposite sides of the axis of said rotor and rotatable in unison therewith, and means for applying fluid pressure in said chamber to fluid in said recess.

3. In a rotary hydraulic machine, a rotor, a plurality of rotatable variable capacity fluid chambers, a plurality of recesses rotatable therewith, and means for communicating fluid pressure from variable capacity chambers on one side of said rotor to recesses on the opposite side thereof.

4. In a rotary hydraulic machine, a rotor, a plurality of rotatable variable capacity fluid chambers, a plurality of recesses rotatable therewith, and a plurality of isolated passages each connecting one of said variable capacity fluid chambers to a recess substantially diametrically opposed thereto.

5. In a fluid pump or motor, a rotor, a plurality of vanes slidably fitted in said rotor, an annular member encircling said vanes and a portion of the said rotor and placed eccentric to the axis of the said rotor, a housing completing the closure of the space in which the said vanes are operable, a bearing in said housing supporting the journal portion of the said rotor, and ports in the said housing for the inlet and outlet of fluid; said rotor having a plurality of recesses in said journal portion and a plurality of isolated fluid ducts each connecting one of the working fluid chambers formed by the said structure with a recess substantially diametrically opposed thereto.

6. In a hydraulic transmission, a pump having an eccentric annular member, a motor having an eccentric annular member, and a ported partition between said pump and motor having different port outlines on the two faces of said partition, with the said different port outlines conforming with oppositely eccentric transverse positions of said annular members and with each annular member in contact with one of the faces of said partition.

7. In a hydraulic transmission, a pump, a motor, an element arranged between the pump and motor and having ports of helical shape, and annular members in sliding contact with each side of said ported element, with said annular members forming displacement control members in said pump and motor and having ranges of action co-operating with the helical form of the ports in said element.

8. In a hydraulic transmission, a pump, a motor, an element having ports of helical shape arranged therebetween, a rotor in said pump having a head abutting said ported element on one side, a rotor in said motor having a head abutting said ported element on the opposite side thereof, with each of said rotors having a plurality of vane supporting portions and a plurality of reduced diameter portions, whereby the reduced diameter portions permit registry with ports of increased area and permit a port contour of more fully helical form.

9. In a hydraulic transmission, a pump, a motor, a ported element between said pump and motor, a rotor in said pump having a head abutting said ported element, a rotor in said motor having a head abutting said ported element on the opposite side thereof, with each of said rotor heads having a plurality of vane supporting portions and a plurality of smaller diameter portions, an annular pump displacement control member surrounding the pump rotor head, an annular motor displacement control member surrounding the motor rotor head, with said displacement control members in sliding contact with the ported element, and the ports in said element having inner contour on a smaller diameter than the vane supporting portions of the said rotors, and outer contours sloped to conform to different outer port outlines on the opposite sides of the said element as determined by different ranges of movement of the displacement control members of the pump and motor.

10. In a hydraulic transmission comprising a fluid pump and a fluid motor connected by ducts to form a substantially closed fluid circuit in which liquid motive fluid is retained in rotational motion as circulated between a rotating structure in said pump and a rotating structure in said motor; means for extracting gases from said liquid in said circuit, comprising a gas collecting recess carried by one of said rotating structures and positioned to collect gas separated from the liquid by centrifugal action caused by the rotational motion of the liquid motive fluid, a leakage collecting container, means for returning liquid fluid from said container to said circuit, a passage connecting said recess to said container, and means associated with said passage for restricting the flow of liquid therethrough.

11. In a hydraulic transmission comprising a fluid pump, a fluid motor, and plural main fluid ducts forming a substantially closed main fluid circuit wherein the bulk of the active fluid is continuously rotated as circulated between said pump and motor; a leakage collecting container, leakage return means, a gas collecting pocket nearer the axis of rotation than the major part of said fluid circuit, and a passage connecting said gas collecting pocket with the said container and wherein a portion of the said passage is of small area to restrict the flow of liquid therein.

12. In a hydraulic transmission comprising a fluid pump and a fluid motor connected by fluid ducts to form a substantially closed main fluid circuit in which the active portion of the motive fluid is circulated between a rotating structure in said pump and a rotating structure in said motor; means for extracting air from the active portion of the motive fluid, comprising a leakage collecting container, means for returning fluid from said container to said main fluid circuit, a gas-collecting recess carried by one of said rotating structures, and a passage interruptedly connecting said recess to said container during rotation of said recess.

13. In a fluid pump or motor, a housing, inlet and outlet fluid connections, a rotatable member, a plurality of members engaging the fluid and movable in a radial direction in the said rotatable member, a control member annularly surrounding a portion of the said rotatable member and slidable in a transverse direction to govern the amount of movement imparted to the said plurality of members by rotation of the said rotatable member, fluid sealing mounting ways for said control member formed in the said housing, opposed fluid chambers in the said housing with the said control member between said chambers and reversibly shiftable by reversible difference in pressure in the said chambers, and means for causing the pressure difference in said chambers to vary in response to changes in pressure in said inlet and outlet fluid connections.

14. A hydraulic transmission comprising a fluid pump of variable and reversible displacement, a fluid motor, ducts forming a fluid circuit between said pump and motor, an element for varying the displacement of said pump, opposed fluid responsive means acting on said element to urge same toward the position of exactly zero pump displacement, fluid passages connecting said opposed fluid responsive means to the opposite sides of said fluid circuit, yieldable means for urging said element away from the zero displacement position, and manually controlled means for bringing said yielding means into or out of operating relation with said element.

15. A hydraulic transmission comprising a pump, a motor and a connecting fluid circuit; an element operable to govern the displacement of the pump or motor, fluid actuated means influencing the operation of the said element, a yieldable member adaptable to influence the operation of the said element, manually operable means to positively disengage the said yieldable member from operative connection with the said element, a second yieldable member operable to influence the operation of the said element in a different way, and manually operable means to bring the said second yieldable member into operative connection with the said element.

16. A hydraulic transmission comprising a variable displacement fluid pump, a fluid motor, a plurality of fluid ducts between said pump and said motor, automatic means normally controlling the displacement of said pump, manually operable means for modifying the action of the said automatic means to reduce the pump displacement below the value normally determined by the said automatic means and stop means simultaneously actuated by said manually operable means into a position preventing reversal of pump displacement in response to said manually operable means.

17. A variable ratio transmission comprising a fluid motor, a fluid pump, a plurality of fluid ducts between said pump and said motor, and means for varying the displacement of said pump, comprising a fluid pressure responsive element actuated by the difference in fluid pressure in the said ducts, two yieldable members, manually operable means to urge said element in one direction under the influence of one of said yieldable members, and separate manually operable means to urge said element in the opposite direction under the influence of the other yieldable member, with stop means associated with said separate means to limit the movement of said element in said opposite direction in response to said separate means.

18. A hydraulic transmission comprising a variable displacement fluid pump, a fluid motor, a plurality of fluid ducts between said pump and said motor, means for varying the displacement of the said pump actuated by difference in fluid pressures in said ducts and such that a given amount of change in the said difference in fluid pressures produces a certain amount of change in pump displacement when said displacement is large and a progressively reduced change in pump displacement as said displacement is progressively less.

19. A hydraulic transmission comprising a variable displacement fluid pump, a fluid motor, a plurality of fluid ducts connecting said pump and motor, a control member for said pump, means for urging said control member toward minimum pump displacement in response to difference of fluid pressures in the said ducts, and yieldable means for resisting movement of said control member toward minimum pump displacement including a yielding member and means for varying the resistance to said movement substantially from the normal resisting ability of said yielding member alone as the pump displacement approaches a certain value within its range.

20. In a hydraulic transmission, the combination of a pump, a motor, connecting fluid ducts forming a substantially closed fluid circuit, and automatic means for varying the displacement of said pump or motor comprising fluid responsive means, yielding means opposed thereto, and displacement control means actuated in variable predetermined relation to the movement of said fluid responsive means, said relation being varied at different positions of said fluid responsive means, but predetermined for any specific position thereof.

21. A hydraulic transmission comprising a pump, a variable displacement fluid motor, a connecting substantially closed fluid circuit having a normal pressure side and a normal return side with the pressures in said sides reversible under certain conditions, a leakage collecting container, a passage for conveying fluid from said container to said return side, means automatically closing said passage against flow of fluid in a reversed direction, a displacement control member, fluid responsive means for urging said control member toward maximum normal motor displacement in response to pressure in said normal pressure side of said circuit and not in response to pressure in said normal return side of said circuit, and means for yieldingly urging said control member in the opposite direction.

22. In a hydraulic transmission, a rotary pump, a variable displacement rotary motor, a motive fluid circuit connecting said pump and motor, and automatic means for varying the displacement of the said motor including a control member governing the displacement of the said motor, opposed fluid responsive means for urging said control member toward maximum motor displacement by fluid pressure in the normal high pressure side of said circuit, and for urging said member in the reverse direction by fluid pressure in the normal low pressure side of the said circuit, and means for preventing movement of said control member in said reverse direction beyond substantially zero motor displacement.

23. In a hydraulic transmission, a pump of reversible displacement, a variable displacement motor, a connecting fluid circuit, a control member for said motor, fluid responsive means for urging the said control member toward increased motor displacement in response to pressure in the normal high pressure side of the said circuit, means for urging the said control member in the reverse direction when the pressures in said circuit are reversed, and manual means for reversing the displacement of the said pump and for simultaneously opposing reduction of motor displacement while said pump displacement is reversed.

24. In a hydraulic transmission, a pump, a variable displacement motor, a plurality of fluid ducts connecting said pump and motor to form a main fluid circuit, a control member for governing the displacement of the said motor, fluid responsive means for urging the said control member toward maximum motor displacement by the difference in fluid pressures in the said ducts in effect in normal driving of a load, means for urging the said control member in the opposite direction, stop means for limiting the maximum movement of said control member in said opposite direction, and unified manually controlled means for reversing the direction of flow of fluid delivered to the said motor, and for simultaneously preventing said control member from utilizing its maximum movement in said opposite direction.

25. A hydraulic transmission comprising a hydraulic pump, a variable displacement hydraulic motor, a plurality of fluid ducts between said pump and said motor and displacement control means for said motor comprising a fluid responsive element, yielding means opposed thereto, means governing the displacement of said motor in predetermined relation to the position of said fluid responsive element, and manually operable means for urging said fluid responsive element toward the position of maximum motor displacement.

26. A variable ratio transmission comprising a variable displacement fluid motor, a fluid pump, a plurality of fluid ducts connecting said pump and motor, and means for varying the displacement of said motor comprising a unitary structure reversibly responsive to reversals of fluid pressure in said ducts and governing the displacement of said motor in predetermined relation to its position, yielding means for urging said structure toward a position of reduced motor displacement, and manually actuated means operable to oppose said yielding means.

27. In a hydraulic transmission, a rotary pump, a variable displacement rotary motor, a motive fluid circuit connecting said pump and motor, and automatic means for varying the displacement of the said motor including a control member governing the displacement of the said motor, opposed fluid responsive means for urging the said control member toward increased motor displacement by fluid pressure in the normal high pressure side of the said circuit, and for urging said control member in the reverse direction by fluid pressure in the normal low pressure side of the said circuit, and means for opposing the movement of said control member in said reverse direction.

28. In a hydraulic machine having working fluid sections in which the fluid pressures are reversible, the sub-combination of servo control means for said machine comprising two control chambers, a control member therebetween and reversibly responsive to reversible difference in pressure in said chambers, means for automatically admitting an individually restricted flow of fluid from the acting high pressure section of said machine to each of said control chambers, valve means for selectively opening an outlet from either of said chambers and means for actuating the said valve means to govern said control member.

29. In a fluid pump or motor, a rotatable member, a plurality of members motively engaging the fluid and rotatable with and slidable in a radial direction in said rotatable member, a control member annularly surrounding a portion of said rotatable member and traversable to control the amount of movement imparted to said plurality of members by rotation of the said rotatable member, a housing having chambers at opposite sides for traversing the said control member by difference in fluid pressures in the said chambers, automatic means for admitting an individually restricted rate of flow of fluid from the high pressure side of said pump or motor to each of the said fluid chambers, valve means for selectively opening an outlet from either of said chambers, and means for actuating the said valve means.

30. A rotary pump of variable and reversible displacement, a plurality of main fluid conveying ducts for said pump, servo operated means for controlling the displacement of said pump, a master control member governing said servo operated means, opposed fluid actuated means responsive to the reversible pressures in said ducts and acting on said master control member, manually actuated reversing means operable to urge said master control member in either direction to cause the pump to deliver fluid in either direction in response to movement of the said master control member across the position of zero pump displacement, and means under separate manual control operable to prevent said manually actuated reversing means from moving said master control member across a position of substantially zero pump displacement.

31. In a hydraulic transmission, a pump or motor having a rotor with impellers slidable radially therein, a guide member limiting the radial movement of said impellers away from the axis of said rotor, servo means for actuating said guide member, governing means for regulating the said servo actuating means to actuate said guide member to follow said governing means, and means for actuating the said governing means.

32. In a hydraulic transmission comprising a pump, a motor and two fluid passages wherein the fluid pressures are reversible, an additional fluid passage, automatic means for maintaining said additional fluid passage in communication with the one of the said two fluid passages in which the fluid pressure is greater, a housing, two fluid chambers in said housing, a displacement control member reciprocable between said chambers, two isolated restricted passages connecting said additional passage to the said fluid chambers, and means for opening an outlet from either of said chambers to actuate said displacement control member.

33. In a rotary hydraulic machine, a housing, a rotatable member, a plurality of members in motive engagement with the fluid and movable in a radial direction in said rotatable member, a control member annularly surrounding a portion of the said rotatable member and reciprocable in a transverse direction to govern the amount of movement imparted to said plurality of members by said rotatable member, two fluid chambers in said housing, fluid sealing mounting ways for said control member formed in said housing between said fluid chambers, a source of fluid under non-reversing pressure, two isolated restricted passages connecting the said source to the said fluid chambers, and means for opening an outlet from either of said chambers to actuate said control member.

34. In a variable ratio hydraulic transmission, a control element operable to directly govern the ratio, servo means for actuating the said control element, a master control member governing the said servo means, fluid actuated means for influencing the operation of the said master control member, yieldable means for influencing the operation of the said master control member, and manual means for rendering the said yieldable means effective or ineffective to influence the operation of the said master control member.

35. A transmission of steplessly variable ratio, a control member for varying the ratio, automatic means for actuating the said control member, manually operable means for influencing said control member comprising a foot pedal and a yieldable element variably deflectible according to the opposition of said automatic means, and means for automatically returning said manually operable means to non-influencing relationship when manual actuation is released.

36. A transmission of steplessly variable and reversible ratio, a control member for governing the ratio, automatic means for actuating the said control member, including a yieldable element with one portion of same held in fixed position during normal driving of a load, manually operable means for yieldingly urging said control member toward neutral position and for simultaneously preventing movement beyond neutral position, and means for automatically returning said manually operable means to an inactive position when manual actuation is released.

37. In a hydraulic transmission, the sub-combination of a housing consisting of a laminated assembly of housing members comprising a pump end-housing, a pump pressure housing, a ported partitioning member, a motor pressure housing, and a motor end-housing stacked in the order enumerated, means for clamping the said housing members together, and two traversable guide members separated by the said ported partitioning member and contained within the said pressure housing members.

38. The structure defined in claim 37, with an outer sealing structure enclosing a leakage collecting cavity and disposed between the peripheral portions of said end housings.

39. A fluid pump or motor having a rotor with a plurality of vanes slidably fitted therein, a plurality of rockers fitted at the outer ends of the said vanes, a guide ring having a cylindrical bore forming a bearing surface for said rockers and thereby governing the sliding action of said vanes by limiting the radial extension thereof, fluid pressure means for maintaining the said vanes at maximum radial extension during operation of the pump or motor, mechanical means for limiting the backing of said vanes, mounting means for the said guide ring permitting transverse movement thereof, and means for traversing said guide ring in said mounting means.

40. In a fluid pump or motor, a rotor comprising a journal portion and a head, a plurality of slots in said head, vanes slidably fitted in said slots, recesses in said head between the vane supporting portions and opening into the plane of the end face of the said rotor head, a housing comprising a main portion and a portion abutting said end face, ports in the latter portion registering successively with the said recesses during rotation of the rotor, balancing recesses formed between said rotor journal portion and said main portion of said housing and positioned to exert both end force and radial force in response to fluid pressures therein, and means for conveying fluid pressures to said balancing recesses.

41. In a fluid pump or motor, a rotor comprising a journal portion and a head, a plurality of slots in said head, a plurality of vanes slidably fitted in said slots, said rotor head having substantially full diameter at the interrupted annular face surrounding its junction with the journal portion and at supporting portions adjacent the said vane slots and having a plurality of recesses between the said supporting portions with the said recesses opening into the end face of the rotor head, a housing comprising a main portion and a portion abutting the said end face, ports in the latter portion registering successively with said recesses during rotation of the rotor, a surface on the rotor journal portion having end projected area, a balancing recess formed between the said surface and the said main portion of the housing, and a fluid passage connecting the said balancing recess to a pressure carrying fluid chamber of the said pump or motor, thereby providing opposing end thrust tending to balance end thrust on the rotor caused by the fluid pressure applied to end areas of the rotor head by fluid under pressure in one or more of said plurality of recesses.

42. In a fluid pump or motor, a rotor having a head portion and a shaft portion, a plurality of vanes slidably fitted in said head, a guide ring having a cylindrical bore adapted to govern the sliding action of the said vanes by limiting the outward movement thereof, mounting means for said guide ring, a recess within the head portion of the said rotor, automatic means for connecting the said recess by fluid passages to whichever side of said pump or motor is under the higher fluid pressure, and a surface on the said rotor having end area exposed to the pressure prevailing in the said recess and tending to balance end thrust on said rotor caused by fluid pressure in said recess.

43. The structure defined in claim 42 in combination with diametrically cooperative means for mechanically limiting the backing of said vanes away from the bore of the said guide ring.

44. In a hydraulic transmission comprising a pump, a motor and a plurality of connecting fluid ducts forming a motive fluid circuit; a member mechanically governing the displacement of said pump, a member mechanically governing the displacement of said motor, independent pilot valve governed fluid powered servo actuating means for each of said members, a source of fluid under non-reversing pressure for supplying fluid to the said actuating means, a unitary master control member independently regulating the governing elements of said servo actuating means, and means for actuating said master control member.

45. The structure defined in claim 44, wherein the said means for actuating the said master control member comprises opposed fluid actuated means and ducts for connecting the opposed means to opposite sides of the said motive fluid circuit.

46. The structure defined in claim 44, wherein the said means for actuating the said master control member comprises opposed fluid actuated means, ducts for connecting the said opposed means to opposite sides of the said motive fluid circuit, and yielding means under manual control for urging said master control member toward either of said fluid actuated means or for placing said master control member exclusively under the control of said opposed fluid actuated means according to the manipulation of the said manually controlled yielding means.

47. A hydraulic transmission comprising a pump, a motor, a plurality of connecting fluid ducts forming a motive fluid circuit, separate fluid powered servo actuated means for independently controlling the displacements of said pump and motor, separate pilot valves for each of said servo actuated means, and means for actuating the said pilot valves comprising a master control member carrying two cam portions with a dwell on one of said cams permitting one of said valves to remain stationary while the other valve is actuated through a portion of its range by movement of said master control member, and means for actuating said master control member.

48. In the apparatus defined in claim 44, two cams on said master control member regulating the said governing elements according to the contours of said cams.

JOHN LINDSAY HITTELL.